United States Patent [19]
Muska

[11] 3,878,458
[45] Apr. 15, 1975

[54] ELECTRICAL SAFETY TEST APPARATUS FOR DETECTING LEAKAGE CURRENT TRIPPING CURRENT AND PROPER GROUNDING

[76] Inventor: William A. Muska, 1378 Ryan, Roseville, Minn. 55117

[22] Filed: Sept. 12, 1973

[21] Appl. No.: 396,419

[52] U.S. Cl. .......................................... 324/51
[51] Int. Cl. ............................................ G01r 31/02
[58] Field of Search ..... 324/51; 340/255; 317/18 A, 317/18 B, 18 D

[56] References Cited
UNITED STATES PATENTS

| | | | |
|---|---|---|---|
| 3,141,128 | 7/1964 | Behr | 324/51 |
| 3,181,060 | 4/1965 | Hull | 324/51 |
| 3,205,436 | 9/1965 | Donahue | 324/51 |
| 3,368,146 | 2/1968 | Regan et al. | 324/51 |
| 3,553,581 | 1/1971 | Tsergas et al. | 324/51 X |
| 3,611,133 | 10/1971 | Tsergas et al. | 324/51 X |
| 3,624,498 | 11/1971 | Smith et al. | 324/51 |
| 3,648,163 | 3/1972 | Pinner et al. | 324/51 |
| 3,728,581 | 4/1973 | Adamo | 317/18 A |
| 3,728,617 | 4/1973 | Potter | 324/51 |
| 3,800,214 | 3/1974 | O'Flynn | 324/51 |
| 3,809,961 | 5/1974 | Kershaw | 317/18 B |
| 3,821,639 | 6/1974 | DeLangis | 324/51 |

FOREIGN PATENTS OR APPLICATIONS

| | | | |
|---|---|---|---|
| 917,436 | 9/1954 | Germany | 324/51 |
| 807,544 | 1/1959 | United Kingdom | 324/51 |

*Primary Examiner*—Gerard R. Strecker
*Attorney, Agent, or Firm*—Jacobson and Johnson

[57] ABSTRACT

A device for testing the safety of operating electrically powered tools, particular at building sites. A compact housing contains an ammeter or other current indicating device, electrical circuitry and a manually operable switch by which the meter is selectively put in circuit to measure the power-line to frame leakage current in the power-operated tool, the tripping current at which a ground fault interrupter or circuit breaker is set, or to establish that the frame of an electrically powered tool is properly grounded.

3 Claims, 3 Drawing Figures

ELECTRICAL SAFETY TEST APPARATUS FOR DETECTING LEAKAGE CURRENT TRIPPING CURRENT AND PROPER GROUNDING

BACKGROUND OF THE INVENTION

It has become not only fashionable but mandatory to provide safety precautions throughout various industries. Among these is in the building trades industry. One important area of safety precaution is in the operation of electrically powered devices such as drills, saws, and the like, at various building sites. This is a particular problem because oftentimes the equipment and the power lines providing the energy to operate the various tools are located in wet or damp areas, especially during the early stages of construction. It is not uncommon for example, to have an electrically powered saw sitting on damp or muddy ground or having the electrical power cable coming from a suitable power source running on the muddy ground and the operator standing in the mud or water while operating the equipment.

A number of safety precautions have been adopted to prevent accidents from electrical shock which could easily occur due to operating under conditions of this nature. For one, each electrically powered tool must have its metal frame grounded. This ground is provided by a wire connection from the frame to the third wire, usually referred to as the ground or common, in the cable which supplies the energy to operate the tool. This cable is usually terminated in a three-prong plug which is inserted into a suitable receptacle coupled to the main power line. In the event a short should occur between one of the hot or power-carrying wires and the frame of the tool, the tool is automatically gounded so that it does not constitute a potential hazard to anyone who comes in contact with it.

Another precaution that has been and is in the process of being established throughout the industry is the installation of a ground fault interrupter (GFI) or circuit breaker in the power line which provides the energy to the tools. The GFI is electrically in circuit between one of the hot lines and the common, and the circuit breaker is set so that if the current flowing in this path should exceed a predetermined amount, usually well below that which would be sufficient to harm a user of the tool, the circuit breaker will trip, removing all power from the line and from all of the tools. There usually will be one GFI for each power line which provides power for a number of tools. The amount of current which would trip the circuit breaker is an accumulation of the leakage currents flowing in all of the tools which are coupled into the power line.

Even with these and other safety precautions, a number of problems occur. For one, it is sometimes possible that the ground wire connection to the frame of the tool may be broken or perhaps was never securely made. For another, if a GFI does trip, it may be difficult to determine the reason. If there are a number of tools in operation on one power line the tripping current may be the result of an accumulation of the leakage currents from a number of the tools or it may be a high leakage current in only a single tool. When the GFI trips, it is usually necessary to call an electrician who might spend a great deal of time trying to establish the source of the trouble. This can be costly when one considers the pay scale of electricians and other tradesmen. During the time that the GFI is tripped, many of the workers would be unable to do anything until the trouble is cleared. Yet another problem is determining if the GFI is set at a correct tripping level. It is possible that it could have been inaccurately set initially or that its setting could have shifted over a period of time. This could result in the GFI tripping even though all equipment was in good and safe working condition.

SUMMARY OF THE INVENTION

A test instrument is provided comprising a housing made of a suitable insulative material, a three-wire cable, a three-socket receptacle, a current-indicating device, preferably an ammeter, an externally extending wire with a clip on one end, a manually operated switch, and a number of circuits between these various component parts. The safety tests which can then be performed by this instrument are as follows:

A. Ground Test  With the three-wire cable plugged into the power line and the cable for the tool plugged into the receptacle, the clip on the outer conductor is attached to the metal frame of the tool and the switch is placed in the "Ground Test" position. Depressing a momentary close test button, which is not necessary to the operation but which is a further convenience and safety precaution, completes a circuit from one of the hot leads to the frame of the tool and through the meter. The meter reading, then indicates if the grounding wire within the tool is intact.

B. Leakage Test  With the plug of the three-wire cable still inserted in the main power line and the plug from the tool still inserted in the receptacle, and the clip removed from the frame, the tool is turned on. The test instrument switch is then positioned to the "Leakage" location. This completes an electrical path from one of the hot leads to the common or ground and through the meter which will then read the amount of leakage current, if any, which is flowing. The cumulative leakage current of a number of tools operating off a single cord can be tested in this fashion.

C. GFI Adjust Test  The plug of the three-wire cable is inserted into the GFI and the test instrument switch positioned to the GFI location. This places the meter in circuit between one of the hot lines and the ground or common wire in the cable through a variable resistance. The resistance is varied and the meter reading observed. The meter reading will increase until it suddenly drops to zero when the GFI trips. The ammeter reading at which this occurs is the tripping level of the GFI. These three tests, which can be made at the construction site and can be done quickly, not only provide additional safety precautions but also permit an electrician or other tradesman to quickly diagnose and determine the cause of any malfunction or inoperation.

Figure 1:
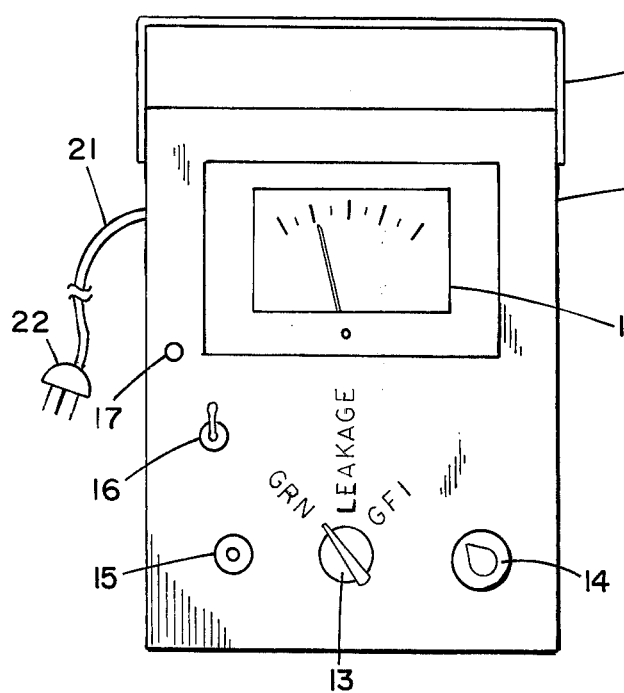
FIG. 1 is a front view of the casing or housing of the test instrument.
Figure 2:
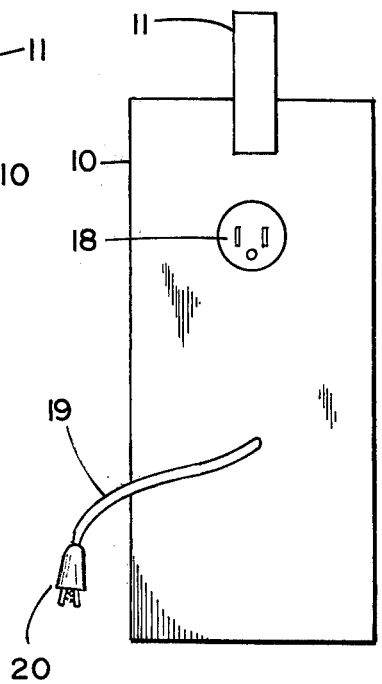
FIG. 2 is a side view.

The housing or casing 10 is preferably in the traditional box-like form made out of hard rubber or plastic or some other suitable electrically insulating material. For convenience, the housing 10 is provided with a carrying handle 11. On the face of the unit is the current indicating scale of an ammeter 12, a hand operated knob 13 for a rotatable three-position electric switch, a rotatable knob 14 for adjusting a resistance contained in the housing, a momentary push button 15, an on-off toggle switch 16, and a pilot light 17. The latter two serve their commonplace function and so will not be further mentioned but are shown in the FIG. 3 schematic.

On one side of the housing 10 is a three-socket receptacle 18 and a wire 19 having a suitable clip 20 at its outer end. At the other side of the housing 10 is a three-wire cable 21 which terminates in a three-prong plug 22. It should be understood that the arrangement and relative locations of the various component parts are merely a matter of choice of functionality and convenience. It should also be understood that throughout this description and claims the words "common" or "ground" are used interchangeably and define the third wire or prong or socket which is in the ground path as distinguished from the hot or power carrying wires, prongs and sockets.

Figure 3:
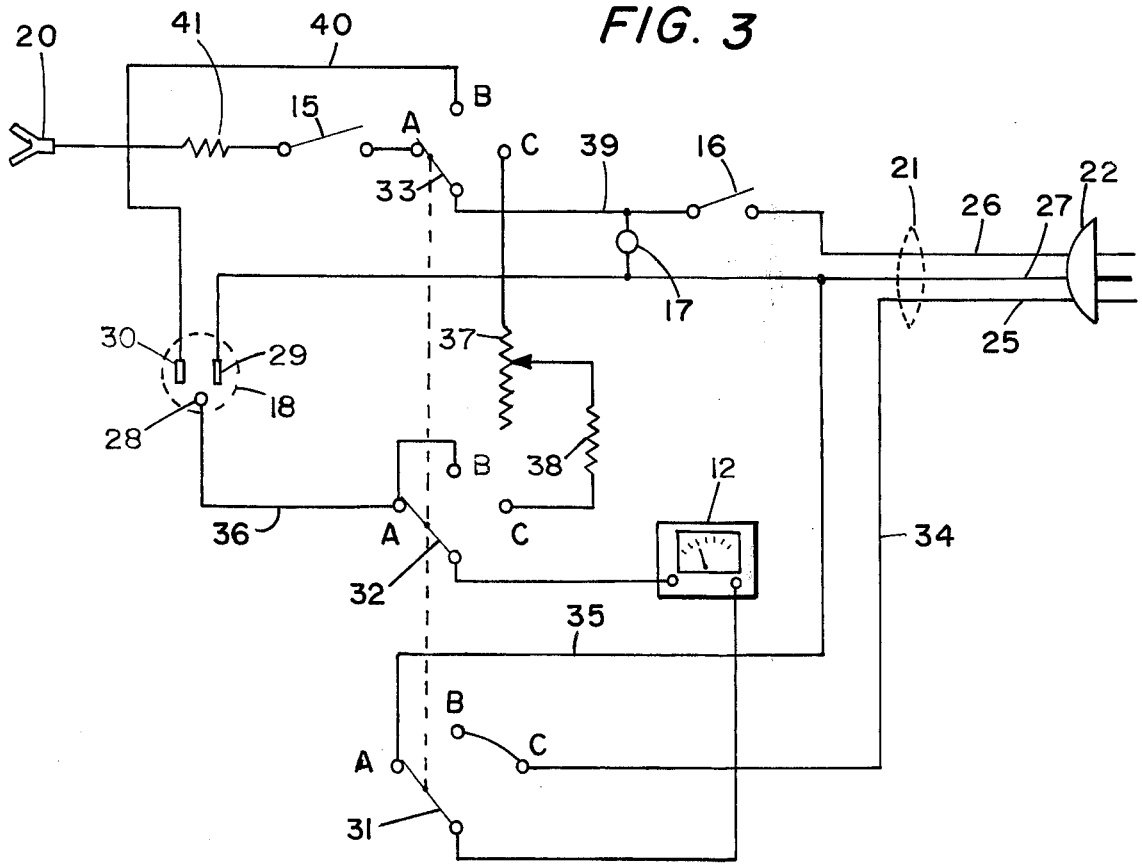
FIG. 3 is an electrical schematic of the instrument circuitry.

Turning next to FIG. 3, the electrical schematic of the test apparatus is illustrated. Cable 21, which has a three prong plug 22 at one end, comprises a ground wire 25 and two hot wires 26 and 27. Traditionally, in the electrical trade, the cable wires appear respectively as green, white and black colored leads. Receptacle 18 has a common socket 28 and two power-carrying sockets 29 and 30. The switch operated by knob 13 is a three-pole ganged switch having rotating arms 31, 32 and 33, all rotated together by a common shaft. The switch can be selectively set to three different positions, which, for ease of explanation, are identified by letters A, B and C corresponding respectively to Ground Test position, Leakage position, and GFI position. For switch arm 31, the terminals corresponding to positions B and C are electrically connected together and for switch arm 32, terminals corresponding to positions A and B are connected together. Switch arm 31 position C is connected to cable conductor 25 through a conductor 34 and switch arm 31 position A is connected to cable conductor 27 through conductor 35. Meter 12 is connected in series between switch arms 31 and 32. Switch position A of arm 32 is connected to socket 28 by conductor 36 and switch position 32C is electrically coupled to switch position 33C through a variable resistor 37, which is adjusted by knob 14, and a fixed resistance 38. Switch arm 33 is connected to cable conductor 26 through wire 37 through the on-off switch 16. Switch position 33B is connected to socket 30 through wire 49 and switch position 33A is connected through the momentary closed switch 15 and a fixed resistance 41 to clip 20. The circuits and the apparatus can best be described by describing their operation during each of the tests the instrument performs.

Considering first the Ground Test, plug 22 is inserted into the power cable, the plug on the power cable of the tool being tested is inserted into receptacle 18, clip 20 is attached to the metal frame of the tool being tested and knob 13 is turned so that switch arms 31, 32 and 33 are in the A or Ground Test position, as illustrated in FIG. 3. When momentary switch 15 is depressed or closed, the circuit path is then completed from cable conductor 27 through switch arm 31, meter 12, switch arm 32, socket 28, the frame of the tool and its grounding wire (if intact), clip 20, resistor 41, switch arm 33, to cable wire 26. The meter 12 will then read the amount of current which is flowing and if the ground connection of the tool under test is satisfactory, all that limits the current flow is the value of resistor 41. Preferably, the resistance value is selected to give a full scale deflection of the meter in this test.

For the Leakage Test, plug 22 is inserted into the main power cable and the plug of the power cable of the tool under test is inserted in receptacle 18. The switch is positioned to place the switch arms to Leakage or B position. The circuit path then runs from cable 21 common conductor 25 through switch arm 31, meter 12, common socket 28 and via any leakage path in the tool through two parallel paths, one via socket 30 and switch arm 33 to conductor 26 and the other via socket 29 to conductor 27. The meter 12 will then read the power-line to common or ground leakage current of the tool being tested. As pointed out earlier, an electrical cord might be used by a number of different tools in parallel can be inserted in receptacle 18 so that the accumulated leakage in a number of tools can be measured at one time. An undue amount of leakage will produce an unacceptable high reading on the meter.

For the GFI test, plug 22 is inserted into a suitable receptacle on the GFI and the switch arms are set to position C. The circuit path that is then completed runs from cable conductor 26, through switch arm 33, variable resistor 37, fixed resistor 38, switch arm 32, meter 12, switch arm 31 to the cable common conductor 25. The meter then reads the current which is flowing through the tripping coil of the GFI. Knob 14 is rotated to reduce the amount of resistance in the circuit which will result in increased current flow. The meter needle is observed. The reading at which the needle drops suddenly to zero is the trip setting for the GFI. It is this level at which the GFI trips to remove all power from the main power cable. This can then be checked to see if it is at the correct setting.

I claim:

1. Electrical safety test apparatus, comprising in combination: a three-conductor electrical energy cable having a three-pronged plug at one end for receiving electrical energy and adapted to mate with a receptacle in a ground fault interrupter, said cable including an electrical common conductor; a three-socket receptacle for mating with a three-pronged plug of a three wire power cable for an electrically powered tool, said receptacle including an electrical common socket; means for visually indicating electrical current flow; a first circuit adapted to establish a leakage current flow path from the non-common conductor of said energy cable to both non-common sockets of said receptacle through the tool mated therewith and to the common socket; a second circuit including variable resistance means adapted to establish a current flow path from one of the non-common conductors of said energy cable, said second circuit not passing through said receptacle; and manually operable switch means for selectively connecting said current indicating means to said common energy cable conductor and to either said first circuit, in series with said leakage current flow path, for measuring tool leakage current or to said second circuit, in series with said current flow path from one of the non-common conductors, when said energy cable plug is mated with a ground fault interrupter for measuring the ground fault interrupter current.

2. Electrical safety test apparatus as set forth in claim 1 further including: a third circuit including resistance means adapted to establish a current flow path from a non-common conductor of said energy cable to the frame of an electrically powered tool mated to said receptacle and to the common socket of said receptacle; said switch means being further operable to selectively connect said current indicating means to the other non-common energy cable conductor and to said third circuit for measuring the amount of electrical continuity between the frame of said tool and its mating receptacle common socket.

3. Apparatus for testing the safety and operation of electrical circuits and electrically powered devices comprising, in combination: a housing constructed out of substantially non-conductive material; a three-conductor energy cable having a three-pronged plug at one end adaptable for mating with a receptacle in a ground fault interrupter, said energy cable attached to said housing, and including an electrical common conductor; a three socket receptacle mounted on said housing for mating with the plug on a power cable for an electrically powered tool, one socket of said receptacle being an electrical common; a conductor extending out from said housing for making electrical connection to the frame of an electrically powered tool which is coupled to said receptacle; a current indicating device mounted on said housing; a variable resistance contained in said housing; a fixed resistance contained in said housing; and manually operable electrical switch means mounted on said housing for selectively completing a first circuit path from the two non-common energy cable conductors to the two non-common receptacle sockets and from the common receptacle socket through said current indicating device to said energy cable common conductor for measuring the leakage current flowing through said electrical tool, or for completing a second circuit path from the cable common conductor through said variable resistance and said current indicating device to a non-common cable conductor for measuring cable current flow when said energy cable plug is mated with a ground fault interrupter receptacle or for completing a third circuit path from one non-common cable conductor to said extending conductor through the frame of a tool coupled to the receptacle to the common receptacle socket and through the fixed resistance and the current indicating device to the other non-common cable conductor for measuring electrical continuity between the frame of the electrically powered tool and its mating receptacle common socket.

* * * * *